July 16, 1968    F. E. ERICKSON    3,392,591
ON-OFF REPEAT CYCLE TIMER

Filed Sept. 19, 1966    3 Sheets-Sheet 1

INVENTOR.
FREDERICK E. ERICKSON
BY
*Meyer, Tilberry & Body*
ATTORNEYS

July 16, 1968
F. E. ERICKSON
3,392,591
ON-OFF REPEAT CYCLE TIMER
Filed Sept. 19, 1966
3 Sheets-Sheet 2
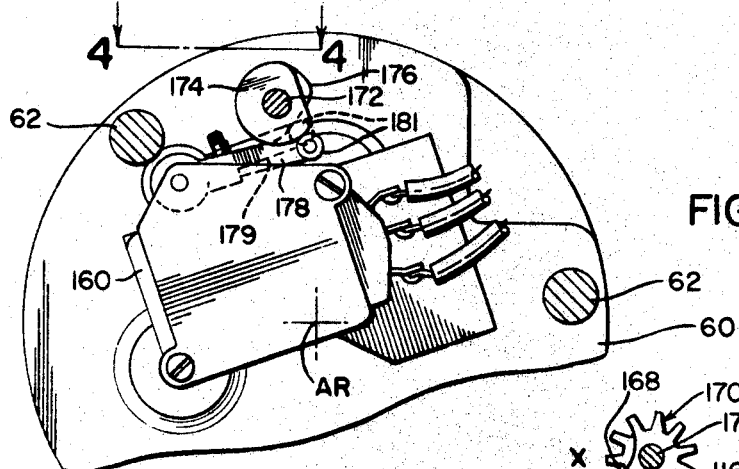
FIG. 3
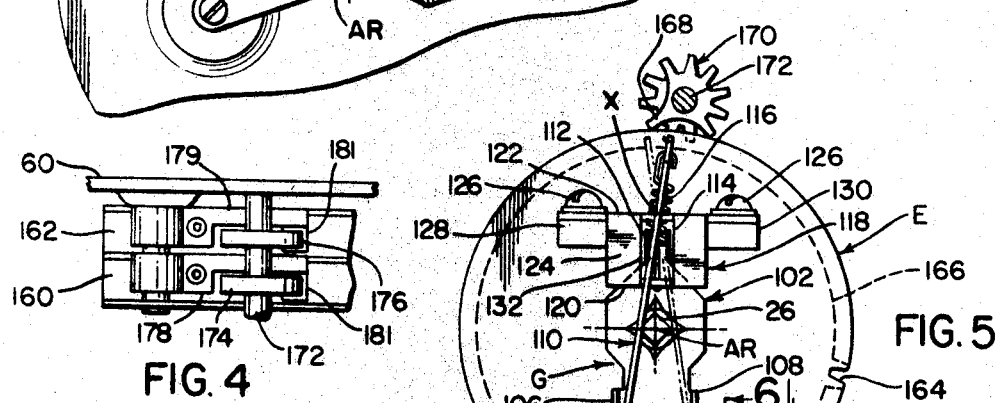
FIG. 4
FIG. 5
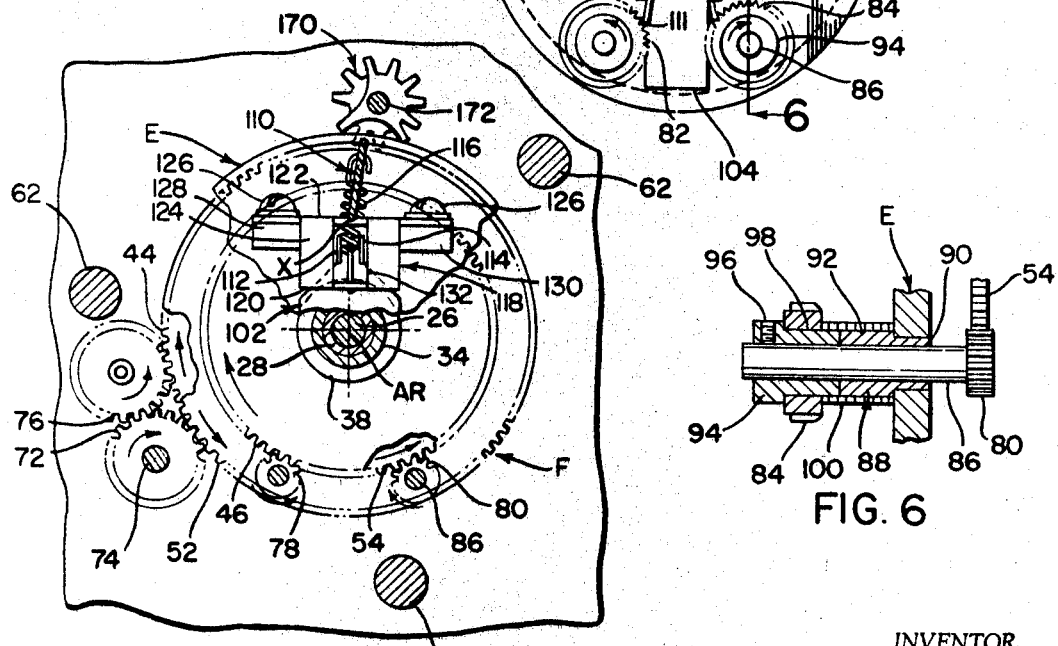
FIG. 7
FIG. 6
INVENTOR.
FREDERICK E. ERICKSON
BY
Meyer, Tilberry & Body
ATTORNEYS July 16, 1968

F. E. ERICKSON 3,392,591

ON-OFF REPEAT CYCLE TIMER

Filed Sept. 19, 1966

INVENTOR.
FREDERICK E. ERICKSON

BY
Meyer, Tilberry & Body

ATTORNEYS

United States Patent Office
3,392,591
Patented July 16, 1968

3,392,591
ON-OFF REPEAT CYCLE TIMER
Frederick Edwin Erickson, Port Byron, Ill., assignor to E. W. Bliss Company, Canton, Ohio, a corporation of Delaware
Filed Sept. 19, 1966, Ser. No. 580,357
10 Claims. (Cl. 74—3.5)

This invention relates to the art of timers and, more particularly, to an improved on-off repeat cycle timer.

The invention is particularly applicable as an on-off repeat cycle timer having independently adjustable on and off periods of time and will be described with particular reference thereto; although, it will be appreciated that the invention has broader applications and may be used, for example, whenever applications require alternate time controlled operations.

On-off repeat cycle timers having independently adjustable on and off periods of time are extensively used by industry for accurately controlling the operating and nonoperating times of a load during each work cycle. One application, for example, is for controlling the working or "on" time, as well as the work feeding or "off" time of a press. Both the "on" time and the "off" time of the press should be accurately controllable and independently adjustable for efficient operation. The foregoing is but one of many applications of an on-off repeat cycle timer, other applications being well known to those skilled in the art.

An on-off repeat cycle timer having independently adjustable on and off periods of time is disclosed in the United States patent to C. L. Anderson 2,289,565, assigned to the same assignee as the present invention. That timer includes a timing plate which is adapted to rotate in opposite diretcions between an on-stop and an off-stop, the two stops being independently adjustable to vary the on and off periods of time timed by the timer. The timing plates carries a progress pointer for rotation therewith between the on-stop and off-stop, each engageable by the pointer for reversing the direction of rotation of the timing plate. A zero position is located between the on-stop and the off-stop, and by means of a Geneva gear mechanism switching means are actuated either to an on condition or an off condition as the progress pointer crosses the zero position while it traverses between the two stops.

The timing plate of the Anderson timer is driven by one of two gears which, in turn, are continuously driven in opposing directions. A pawl reversal mechanism carried by the timing plate is actuated when the progress pointer engages either the on or off stop to respectively engage the teeth on the periphery of either the first or second gears to drive the timing plate. For timing accuracy, during the reversing operation of the direction of rotation of the timing plate, the two gears each have on the order of three-hundred and sixty teeth to permit reversal of the timing plate within one degree of its rotation. The diameter of these gears must be large to permit practical teeth size for the reversal operations.

The present invention is directed toward a repeat cycle timer having an improved means for driving a timing plate so as to obtain timing accuracy comparable to the Anderson timer, but of much smaller unit size.

In accordance with the present invention, the repeat cycle timer includes a timing plate movable in opposing directions; first and second rotatable members; means for continuously driving the first and second members in opposing directions; first and second lock pinions respectively driven by the first and second members, each of the pinions being secured to a shaft rotatably mounted in the timing plate and having a rotation unlocked condition with respect to the plate and a rotation locked condition with respect to the plate; and, timing plate direction control means for actuating one of the pinions to its locked condition, whereby the timing plate is driven in a direction determined by the direction of rotation of the member driving the locked pinion.

In accordance with a more limited aspect of the present invention, each of the pinions drives a ratchet wheel having a plurality of teeth and the direction control means includes a pawl member adapted for engagement with the teeth of one of the wheels to prevent rotation of that wheel and its pinion relative to the timing plate.

Still further in accordance with the invention, the timing plate is rotationally movable in opposing directions about an axis, the pawl member has one end thereof adapted for engagement with the ratchet wheels and is pivotally mounted to the plate for pivotal movement about a pivot axis extending parallel to the rotational axis and located substantially diametrically opposite the ratchet wheels with respect to their rotational axes, and an overcenter spring couples the pawl member to the plate.

Still further in accordance with the invention, the overcenter spring takes the form an elongated coil spring cradled between two upstanding flanges depending from a bracket secured to a timing shaft extending loosely through and coaxial with the plate, whereby as the plate rotates about its rotational axis it drives the timing shaft about the rotational axis through the overcenter spring and the bracket.

Still further in accordance with a more limited aspect of the present invention, the bracket includes a pair of upstanding pawl trip flanges depending therefrom and straddling the pawl member in such a manner that when a progress pointer secured to the timing shaft engages one of two stop members to prevent further rotation in a first direction of the timing shaft, the timing plate and pawl member continue to rotate in the first direction until such time as the pawl member engages one of the flanges, whereupon the pawl member is positively disengaged from one of the ratchet wheels and is driven overcenter by the overcenter spring to engage the other ratchet wheel, causing the timing plate to commence rotation in a direction opposite to the first direction.

The primary object of the present invention is to provide a repeat cycle on-off timer having timing accuracy comparable to that of the Anderson timer, but of much smaller unit size.

A still further object of the present invention is to provide an improved on-off repeat cycle timer which is simple in construction and economical to manufacture.

It is a still further object of the present invention to provide an on-off repeat cycle timer which may be adjusted any time during a timed cycle of operation.

A still further object of the present invention is to provide an improved on-off repeat cycle timer incorporating a single snychronous motor thereby eliminating complicated gear changing apparatus.

The foregoing and other objects and advantages af the invention will become apparent from the following description of the preferred embodiment of the invention as read in connection with the accompanying drawings in which:

FIGURE 3 is a sectional view taken along line 3—3 looking in the direction of the arrows in FIGURE 2;

FIGURE 4 is a sectional view taken along line 4—4 looking in the direction of the arrows in FIGURE 3;

FIGURE 5 is a sectional view taken along line 5—5 looking in the direction of the arrows of FIGURE 2;

FIGURE 6 is a sectional view taken along line 6—6 looking in the direction of the arrows in FIGURE 5;

FIGURE 7 is a sectional view taken along line 7—7 looking in the direction of the arrows of FIGURE 2;

Figure 1:
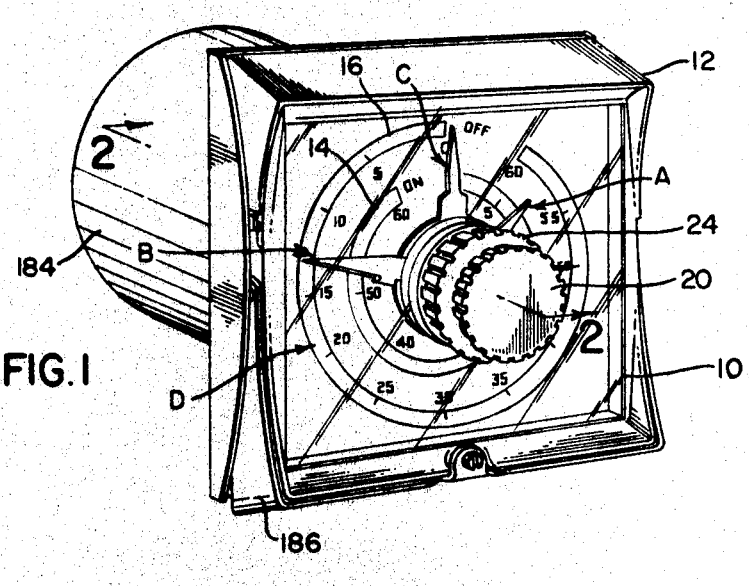
FIGURE 1 is a perspective view illustrating the preferred embodiment of the invention.
Figure 2:
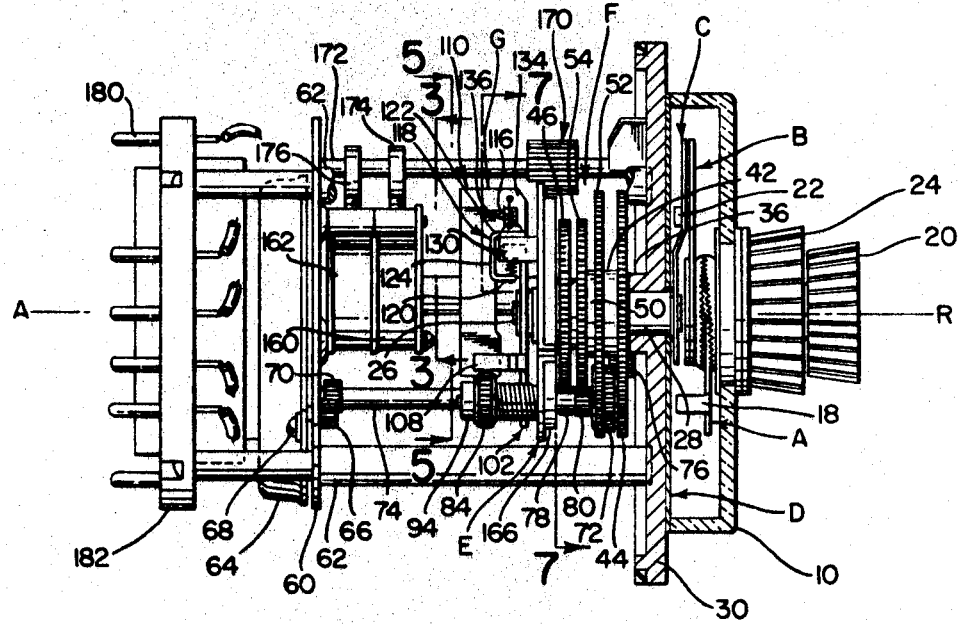
FIGURE 2 is a sectional view taken along line 2—2 looking in the direction of the arrows in FIGURE 1.

Referring now to the drawings wherein the showings are for purposes of illustrating a preferred embodiment of the invention only, and not for purposes of limiitng same, the repeat cycle timer as illustrated in FIGURES 1 and 2 generally comprises an on pointer A and an off pointer B which are independently adjustable; a progress pointer C movable between pointers A and B; a time calibrated dial face D; a timing plate E; a timing plate driving mechanism F; and, a timing plate direction control mechanism G.

ON, OFF AND PROGRESS POINTERS

The on and off pointers A and B and the progress pointer C are located between a transparent plastic window 10 supported by a frame 12, and calibrated dial D. The calibrated dial includes an on scale 14 and an off scale 16. The on scale 14 is calibrated in time units of five increments, from 0 to 60, in a clockwise direction, as viewed in FIGURE 1. Similarly, the off scale 16 is calibrated in time units of five increments, from 0 to 60, in a counterclockwise direction as viewed in FIGURE 1.

Figure 8:
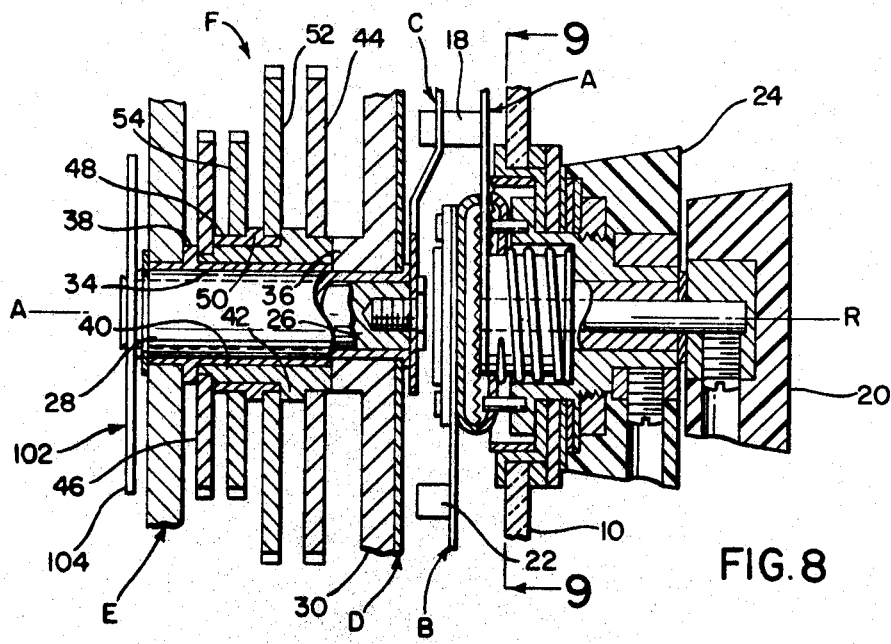
FIGURE 8 is an enlarged sectional view with parts broken away of a portion of the view illustrated in FIGURE 2.
Figure 9:
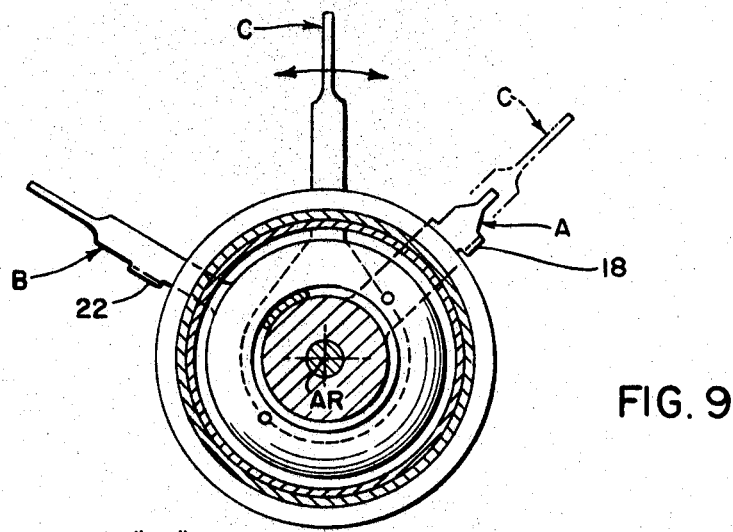
FIGURE 9 is a sectional view taken along line 9—9 looking in the direction of the arrows in FIGURE 8; and, FIGURE 10 is a graphical illustration of one aspect of the operation of the invention.

The on pointer A, which has a stop member 18 depending therefrom in the direction of calibrated dial D, is angularly adjustable about axis of rotation AR by an on knob 20. Similarly, the off pointer B, which has a stop member 22 depending therefrom in the direction of calibrated dial D, is angularly adjustable about axis of rotation AR by an off knob 24. The internal mechanism coupling knobs 20 and 24 with pointers A and B form no part of the present invention and, for example, may take the form as illustrated in FIGURE 8. The mechanism preferably permits knobs 20 and 24 to independently adjust the angular positions of pointers A and B so that, as will be appreciated from the description which follows, the on and off timed periods may be independently adjustable. In addition, the internal mechanism preferably provides sufficient friction to prevent movement of the setting of pointers A and B when the respective pointers are engaged by progress pointer C. Alternatively, if desired, the on and off pointers A and B and the mechanisms for independently adjusting the settings of the pointers may be constructed in accordance with the teachings of the United States patent to C. L. Anderson 2,289,565, assigned to the same assignee as the present invention.

Progress pointer C has one end thereof securely mounted to one end of shaft 26 for rotation about axis AR between the on pointer A and the off pointer B. Shaft 26 is rotatably mounted within a sleeve 28, which in turn is mounted to a face plate 30, carrying calibrated dial D.

TIMING PLATE DRIVING MECHANISM

A bushing 34 coaxially and loosely surround sleeve 28 and has one end located adjacent a flange 36 of face plate 30. In addition, a shoulder 38 depends radially outward from bushing 34. Timing plate E is secured to bushing 34, adjacent shoulder 38 at the left end of the sleeve, as viewed in FIGURE 8. Another bushing 40 loosely and coaxially surrounds a portion of the length of bushing 34 between shoulder 38 and flange 36 of face plate 30. Bushing 38 also has a shoulder 42 extending radially outward therefrom. A gear 44 is secured to bushing 40 between shoulder 42 and flange 36 of face plate 30. In addition, a second gear 46 is secured to bushing 40 at the left end of the bushing, as viewed in FIGURE 8. In this manner, gears 44 and 46 rotate together in the same direction about axis AR. Lastly, another bushing 48 coaxially and loosely surrounds a portion of the length of bushing 40 between gear 46 and shoulder 42. Bushing 48 has a shoulder 50 extending radially outward therefrom. A gear 52 is secured to bushing 48 between shoulders 50 and 42 of bushing 40. a second gear 54 is secured to bushing 48 between gear 46 and shoulder 50. In this manner, gears 52 and 54 rotate in the same direction about axis of rotation AR. Also, bushings 40 and 48 may rotate in opposing directions relative to each other about axis AR. As shown in FIGURE 2, gears 46 and 54 are of the same diameter and gears 44 and 52 are of the same diameter, but are each of greater diameter than gear 46 or 54.

As shown in FIGURE 2, a rear mount plate 60 is spaced rearwardly from face plate 30 and secured thereto by means of suitable support posts 62. A synchronous timing motor 64 having an output gear 66 is mounted to plate 60, as by suitable screws 68. Gear 66 meshes with gear 70 which drives a gear 72 by means of a common shaft 74, journaled for rotation in plates 30 and 60. Gear 72, in turn, meshes with an idler gear 76 mounted to face plate 30. As best shown in FIGURE 7, idler gear 76 meshes with and drives gear 44 in accordance with the directions of the arrows. Also, gear 72 meshes with and drives gear 52 in a direction opposite to that of gear 44 about axis of rotation AR. Gear 46, which is coupled to gear 44 so that it rotates in the same direction as gear 46 about axis of rotation AR, meshes with and drives a lock pinion 78. Similarly, gear 54, which is coupled with gear 52, meshes with and drives a lock pinion 80.

Lock pinions 78 and 80 are respectively coupled to and drive ratchet wheels 82 and 84. As best shown in FIGURES 5 and 6, ratchet wheels 82 and 84 are mounted to timing plate E at points located radially spaced from the axis of rotation AR. The mounting structure and the structure coupling lock pinions 78 and 80 with ratchet wheels 82 and 84, respectively, is substantially identical and, accordingly, only the structure associated with lock pinion 80 and ratchet wheel 84 is described in detail, with reference to FIGURE 6. Lock pinion 80 is secured at one end of a shaft 86, which extends coaxially through a bearing 88 having a cylindrical shank portion 90 secured to timing plate E. The axis of rotation of shaft 86 extends parallel to that of axis of rotation AR of timing plate E. Bearing 88 also includes a hub 92 which extends through shank portion 90 away from lock pinion 80. To the left, as viewed in FIGURE 6, of bearing 88, there is provided a cylindrical sleeve 94 which coaxially surrounds shaft 86 and secured thereto as by a set screw 96. Sleeve 94 also includes a recessed cylindrical hub 98 which extends toward hub 92 of bearing 88. Ratchet wheel 84 is secured to sleeve 94 at hub 98. An elongated coiled spring 100, which may be constructed of a single helically preshaped wire of rectangular cross section, coaxially surrounds adjacent portions of hubs 92 and 98 between ratchet wheel 84 and timing plate E. Preferably, the internal diameter of spring 100 is initially smaller than the external diameter of hubs 92 or 98 so that the spring tightly grips both hubs in such a manner that rotation of shaft 86 in a counterclockwise direction, as viewed in FIGURE 5, tends to tighten the gripping relationship of the spring on hubs 92 and 98, i.e., rotation in this direction causes the spring to wind more tightly so that its internal diameter tends to decrease. However, spring 100 permits free rotation in a clockwise direction of ratchet wheel 84 with respect to bearing 92 and timing plate E, since this direction of rotation tends to increase the internal diameter of spring 100. Similarly, the internal mechanism of ratchet wheel 82 is such that the spring 100 for ratchet wheel 82 permits relatively free rotation of the wheel in a counterclockwise direction, as viewed in FIGURE 5, with respect to its bearing 92 and timing plate E while impeding rotation in a clockwise direction.

TIMING PLATE DIRECTION CONTROL MECHANISM

The timing plate direction control mechanism G includes a trip bracket 102 which, as best shown in FIGURES 5 and 8, is secured, as by staking, to one end of timing shaft 26. Bracket 102, which defines a plane substantially parallel to timing plate E, includes an elongated portion 104 which extends between ratchet wheels 82 and 84. Portion 104 includes a pair of laterally spaced, upstanding flanges 106 and 108 which straddle a pawl 110, to be described in greater detail hereinafter. In addition, there is provided at the opposite end of bracket 102, with respect to shaft 26, a pair of upstanding flanges 112 and 114 which serve to cradle the body portion of an elongated overcenter spring 116, to be described in greater detail hereinafter.

As best shown in FIGURES 2 and 5, a lock pawl bracket 118 is mounted on timing plate E for supporting pawl 110. Bracket 118 is U-shaped in cross section, as shown in FIGURE 2, and includes two legs 120 and 122 connected by an intermediate portion 124. Leg 122 is secured, as by screws 126, to upstanding flanges 128 and 130, respectively, depending from timing plate E. A slot 132 extends through intermediate portion 124 as well as through a portion of legs 120 and 122 of bracket 118. Slot 132 overlies and is in registry with upstanding flanges 112 and 114 of trip bracket 102. Lock pawl 110, which preferably takes the form of an elongated, relatively thin member constructed of resilient material, such as spring steel, has a portion of its length located within slot 132 with its lower edge resting on the upper edge of bracket leg 122. In addition, pawl 110 has a leg portion 134, best shown in FIGURE 2, which extends toward timing plate E and includes a knife edge (not shown) which rests in a V-shaped notch (not shown) in the outer surface of leg 122 defining a pivot axis which extends perpendicularly through point X in the plane of the paper, as illustrated in FIGURE 5. Leg portion 134 of pawl 110 also includes a recess 136 which receives a portion of the body portion of spring 116. Spring 116 is secured at one end to leg 134 and then extends through recess 136, an aperture (not shown) in bracket 122, and is secured at the other end to bracket leg 120. In its overcenter position, spring 116 defines an axis which extends through pivot axis X, axis of rotation AR and midway between ratchet wheels 82 and 84.

Timing plate E controls the operation of an on switch 160 and an off switch 162 through a Geneva gear mechanism including teeth 164 extending radially outward from a recess portion 166 of the timing plate. Teeth 164 serve to receive a tooth 168 of a gear 170 fixed to switch shaft 172. Shaft 172 is journaled for rotation between plates 30 and 60 and carries an on cam 174 and an off cam 176 for actuating switches 160 and 162, respectively. As shown in FIGURE 3, switches 160 and 162 include cam follower arms 178 and 179, each pivotally mounted at one end of its respective switch. Arms 178 and 179 are resiliently biased so that their respective cam follower rollers 180 and 181 bear against the cam surfaces of cams 175 and 176, respectively. Cams 174 and 176 are angularly offset with respect to each other about shaft 172 so that as progress pointer C traverses in a clockwise direction through the zero position, on dial face D, the Geneva gear mechanism drives shaft 172 in a counterclockwise direction, as viewed in FIGURE 3, a sufficient distance that cam 174 cams against pivot arm 178 to actuate switch 160. The switch remains actuated until the progress pointer traverses in a counterclockwise direction, as viewed in FIGURE 1, through the zero position, whereupon the Geneva gear mechanism drives shaft 172 in a clockwise direction, as viewed in FIGURE 3, a sufficient distance that cam 176 pivots arm 179 of off switch 162 to its switch actuation position and cam 174 pivots arm 178 to its nonactuating position. Therefore, switch 160 is nonactuated and switch 162 is actuated. The electrical connections for switches 160 and 162 and motor 64 are connected to a plurality of plug-in terminals 180 which extend through an insulator base 182, suitably secured to rear mount plate 60. The plug-in prongs preferably are adapted for plug-in mounting in the base of a plug-in cylindrical type receptacle 184. Receptacle 184 together with lock-unlock lever arm 186, secured to the timer, are preferably constructed in accordance with the teachings of the United States patent to V. C. Blecker et al. 3,054,023, assigned to the same assignee as the present invention.

OPERATION

In operation, energization of unidirectional motor 64 causes the motor's output gear 66 to drive shaft 74 through gear 70. Referring now to FIGURE 7, it will be noted that shaft 74 drives gear 72 in a clockwise direction. Gear 72, in turn, drives gear 76 in a counterclockwise direction and also drives gear 52 in a counterclockwise direction about its axis of rotation AR. Since gear 54 is coupled to gear 52 it also rotates in a counterclockwise direction about its axis of rotation AR. Gear 76 drives gear 44 in a clockwise direction about its axis of rotation AR. Since gear 46 is coupled to gear 44 it is also driven in a clockwise direction about its axis of rotation AR. Gear 46, in turn, drives lock pinion 78 in a counterclockwise direction about its axis of rotation. Similarly, gear 54 drives lock pinion 80 in a clockwise direction about its axis of rotation.

Lock pinion 78 drives ratchet wheel 82 in a counterclockwise direction and lock pinion 80 drives ratchet wheel 84 in a clockwise direction, as shown in FIGURES 5 and 7. However, end 111 of lock pawl 110 is in engagement with the teeth of ratchet wheel 82, preventing counterclockwise movement of the ratchet wheel. This is the locked condition of the ratchet wheel, whereupon further rotation of gear 46 drives timing plate E in a clockwise direction about axis of rotation AR, as viewed in FIGURE 5. Timing shaft 26 is also driven in a clockwise direction, as viewed in FIGURE 5, since it is coupled to timing plate E by means of bracket flanges 112 and 114 which cradle overcenter spring 116. Since progress pointer C is secured to timing shaft 26 it rotates in a counterclockwise direction, as viewed in FIGURE 1, about axis of rotation AR. Further rotation of pointer C in the counterclockwise direction terminates when the pointer engages stop member 22 of off pointer B. Thus, shaft 26 comes to rest. Referring now to FIGURE 5, it will be noted that timing plate E, however, continues to rotate in a clockwise direction, as viewed in FIGURE 5, about axis of rotation AR since it is not rigidly connected to shaft 26. As timing plate E continues to rotate, overcenter spring 116 is displaced overcenter to the left of point X, as viewed in FIGURE 5. Lock pawl 110 would now pivot in a counterclockwise direction to engage ratchet wheel 84 except that the angle of contact of the teeth on wheel 82 is such that pawl 110 cannot trip. Further rotation of timing plate E carries lock pawl 110 into engagement with flange 106, which forces end 111 of pawl 110 out of engagement with wheel 82. Pawl 110 pivots in a counterclockwise direction and engages wheel 84. This permits ratchet wheel 82 to rotate in a counterclockwise direction, as viewed in FIGURE 5, and prevents clockwise direction of ratchet wheel 84, as viewed in FIGURE 5. Thus, the timing plate E reverses its direction of rotation and commences to rotate in a counterclockwise direction about axis of rotation AR, as viewed in FIGURE 5.

Upstanding flanges 106 and 108, depending from trip bracket 102, serve to positively disengage lock pawl 110 from ratchet wheels 82 and 84, during the reversal operation. Thus, for example, when pawl 110 is in engagement with ratchet wheel 82 and progress pointer C is in engagement with off stop member 22 of pointer B, the timing plate E will continue to rotate relative to shaft 26 in a clockwise direction, as viewed in FIGURE 5. If the rotation of timing plate E is extremely slow when the trip bracket 102 is at rest, the overcenter spring 116 will very slowly be displaced to its overcenter position with respect to lock pawl 110, such that the lock pawl will move out of engagement with ratchet wheel 82, as the overcenter position is slowly passed. During such a condition, the force exerted by the overcenter spring 116 may not be sufficient to fully trip the lock pawl 110 into engagement with ratchet wheel 84. Under this condition, ratchet wheels 82 and 84 would both be released and hence rotation of timing plate E would terminate since lock pinions 78 and 80 would be free to rotate. Accordingly, it is possible that timing plate E would not rotate far enough to cause overcenter spring 116 to exert enough force to fully trip the lock pawl 110 and, hence, a stalled condition of the timing plate would result. This condition is prevented by flanges 106 and 108. In the illustration just discussed, pawl 110 would engage flange 106 whereby the flange would cause pawl 110 to positively break engagement with ratchet wheel 82, whereupon the pawl would be tripped overcenter by spring 116 to engage ratchet wheel 84. Flange 108 serves in a similar manner to positively disengage pawl 110 from ratchet wheel 84.

As discussed hereinbefore, ratchet wheels 82 and 84 are permitted free rotation in their respective counterclockwise and clockwise directions, as viewed in FIGURE 5, but rotation in the opposite directions is impeded by spring 100 associated with each ratchet wheel (as discussed with respect to ratchet wheel 84 with reference to FIGURE 6). The purpose of this function is described below. As shown in FIGURE 5, lock pawl 110 is in engagement with ratchet wheel 82 preventing counterclockwise rotation of the ratchet wheel. Accordingly, timing plate E is driven in a clockwise direction about its axis of rotation AR. If ratchet wheel 82 was permitted free rotation in a clockwise direction (opposite to its normal rotation), timing plate E might be advanced in its clockwise rotation due to inertia of the timing plate and the mechanism mounted thereon if vibration or shock were present, since accelerated clockwise rotation of plate E would be opposed only by the relatively low torque required to rotate ratchet wheel 82 in a clockwise direction. This might result in an error in timing since timing plate E would have advanced at a speed greater than the driving speed provided by motor 64. The friction provided by spring 100, as discussed hereinbefore, prevents such advancement of plate E. That is, spring 100 provides sufficient friction to prevent inertial advancement of plate E.

By limiting the length of hub 98 located within spring 100, a controlled amount of friction is required to rotate the hub and its associated members in a direction opposite to its normal direction of rotation. This condition is desirable since during the timing operation it may be desirable to reduce the setting of a timed interval by manually turning either knob 20 or 24. Thus, for example, as progress pointer C approaches on pointer A, it may be desirable to reduce the setting of the on pointer to a position representing one-fourth, or the like, of that calibrated on scale 14. In order to manually reduce the time setting of the on pointer A during this condition, it must be possible to advance the progress pointer C, since the stop member 18 of the on pointer will strike the progress pointer C as the on pointer is advanced in a counterclockwise direction, as viewed in FIGURE 1. The aforementioned controlled amount of friction required to rotate lock ratchet wheels 82 and 84 allows this manual advance of the progress pointer. Advancing the on pointer A causes the pointer to engage the progress pointer C, thereby tripping the reversal mechanism causing the progress pointer to reverse its direction of rotation. Further movement of the progress pointer, caused by on pointer A, results in the extended portion 104, of trip bracket 102, striking bearing 88 associated with ratchet wheel 82 to limit the travel of the trip bracket and thereby prevent damage to overcenter spring 116. Further advancement of progress pointer C and timing plate E is obtained by overcoming the friction required to rotate ratchet wheel 82 in a clockwise direction, as viewed in FIGURE 5. In this manner, the time setting of pointers A and B may be adjusted during the timing operation, independently of the position of progress pointer C.

Figure 10:
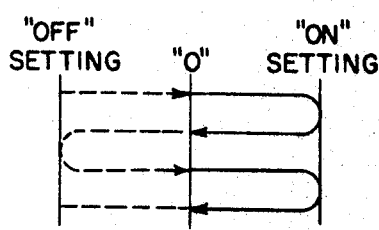

As shown by the solid lines in FIGURE 10, as progress pointer C traverses through the zero position, on switch 160 is actuated by cam 174 and remains actuated even though the timing plate E reverses its direction of rotation when progress pointer C strikes the on pointer A. As the pointer C traverses in the direction toward off pointer B, it crosses the zero position at which time the Geneva gear mechanism serves to deactuate on switch 160 and actuate off switch 162, through cam 176. Switch 162 remains actuated, as shown by the dotted lines in FIGURE 10, until the progress pointer has reversed its direction of rotation upon striking off pointer B, and then crosses the zero position as it traverses from off pointer B to on pointer A.

The invention has been described in connection with a particular preferred embodiment, but is not to be limited to same. Various modifications may be made without departing from the scope and spirit of the present invention as defined by the appended claims.

Having thus described my invention, I claim:

1. A repeat cycle timer including:
a timing plate movable in opposite directions;
first and second rotatable members;
means for continuously driving said first and second members in opposing directions;
first and second lock pinions respectively driven by said first and second members, each of said pinions being secured to a shaft rotatably mounted in said timing plate and having a rotation unlocked condition with respect to said plate and a rotation locked condition with respect to said plate; and
timing plate direction control means actuating one of said pinions to its locked condition, whereby said timing plate is driven in a direction determined by the direction of rotation of the said member driving said locked pinions.

2. In a repeat cycle timer as set forth in claim 1, wherein each said first and second pinions drives a ratchet wheel having a plurality of teeth.

3. A repeat cycle timer as set forth in claim 2, wherein said directional means includes a pawl member adapted for engagement with the teeth of one of said wheels to prevent rotation of said one wheel and its pinion relative to said timing plate.

4. A repeat cycle timer as set forth in claim 3, wherein said pawl member is pivotally mounted on said plate for pivotal movement between said first and second ratchet wheels.

5. A repeat cycle timer as set forth in claim 4, wherein said plate is rotationally movable in opposing directions about an axis, said pawl member having one end thereof adapted for engagement with said ratchet wheels and being pivotally mounted to said plate for pivotal movement about a pivot axis extending parallel to said rotational axis and located substantially diametrically opposite said ratchet wheels with respect to said rotational axis, and an overcenter spring coupling said pawl member to said plate from a point between the other end of said pawl member and said pivot axis to a point between said pivot axis and said rotational axis.

6. A repeat cycle timer as set forth in claim 5, wherein said overcenter spring has an overcenter position at which the axis defined by said spring extends through said pivot axis, said rotational axis and a point midway between the axes of rotation of said ratchet wheels.

7. A repeat cycle timer as set forth in claim 6, wherein said overcenter spring is an elongated coil spring and wherein said spring is cradled between two upstanding flanges depending from a bracket, said bracket being secured to a timing shaft extending loosely through and coaxial with said plate, whereby as said plate rotates about said rotational axis it drives said timing shaft about said rotational axis through said overcenter spring and said bracket.

8. A repeat cycle timer as set forth in claim 7, including an off stop member and an on stop member, a progress pointer secured to said timing shaft for rotational movement therewith between and limited by the locations of said stop members.

9. A repeat cycle timer as set forth in claim 8, wherein said bracket has a pair of upstanding pawl trip flanges depending therefrom and straddling said pawl member in such a manner that when said progress pointer engages one of said stop members to prevent further rotation in a first direction of said timing shaft and said bracket, said timing plate and pawl member continue to rotate in said first direction until said pawl member engages one of said flanges whereupon said pawl member is positively disengaged from one of said ratchet wheels and is driven overcenter by said overcenter spring to engage said other ratchet wheel, causing said timing plate to commence rotation in a direction opposite to said first direction.

10. A reset timer as set forth in claim 2, wherein each said lock pinion is secured to one end of a shaft extending through a bearing securely mounted in said plate, said bearing having an extended cylindrical hub portion extending from said plate toward the other end of said shaft, a sleeve coaxially mounted about and secured to said other end of said shaft and having a cylindrical hub portion extending toward the hub portion of said bearing, said sleeve carrying one of said ratchet wheels for rotation therewith, and a coiled spring coaxially wrapped about said hub portions in such a manner and having an internal diameter sufficiently small relative to the outer diameters of said hub portions to tightly grip said hub portions when said pinion is rotated in one direction to impede such rotation while permitting essentially free rotation of said pinion and ratchet wheel in an opposite direction.

References Cited
UNITED STATES PATENTS

| | | | |
|---|---|---|---|
| 2,289,565 | 7/1942 | Anderson | 200—38 |
| 3,081,638 | 3/1963 | Bowen | 74—3.5 |

MILTON KAUFMAN, *Primary Examiner.*